United States Patent [19]

Miyashita

[11] Patent Number: 5,100,983
[45] Date of Patent: Mar. 31, 1992

[54] PROCESS FOR PRODUCING SYNDIOTACTIC POLYMER OF AROMATIC VINYL COMPOUNDS

[75] Inventor: Akira Miyashita, Ageo, Japan

[73] Assignee: Tosoh Corporation, Shinnanyo, Japan

[21] Appl. No.: 666,207

[22] Filed: Mar. 7, 1991

[30] Foreign Application Priority Data

Mar. 7, 1990 [JP] Japan .................................. 2-53711

[51] Int. Cl.$^5$ .............................................. C08F 4/64
[52] U.S. Cl. .................................. 526/160; 526/346; 502/103; 502/154
[58] Field of Search ................ 526/160, 346; 502/103, 502/154

[56] References Cited

U.S. PATENT DOCUMENTS

| | | | |
|---|---|---|---|
| 4,874,734 | 10/1989 | Kioka et al. | 526/160 X |
| 4,962,262 | 10/1990 | Winter et al. | 526/160 X |
| 4,978,730 | 12/1990 | Maezawa et al. | 526/160 X |
| 5,008,356 | 4/1991 | Ishimaru et al. | 526/160 X |
| 5,017,665 | 5/1991 | Chang | 526/160 X |

FOREIGN PATENT DOCUMENTS 2121708  6/1987  Japan .................................. 526/160

*Primary Examiner*—Fred Teskin
*Attorney, Agent, or Firm*—Oblon, Spivak, McClelland, Maier & Neustadt

[57] ABSTRACT

A catalyst for polymerizing an aromatic vinyl compound, comprising a transition metal compound as a catalyst component (A) represented by the general formula

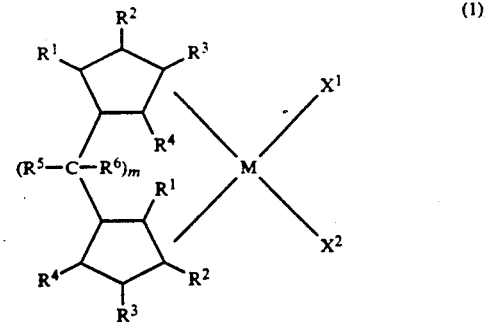

where M is an element of Group IVb of the Periodic Table of Elements; $X^1$ and $X^2$ are respectively halogen; $R^1$, $R^2$, $R^3$, $R^4$, $R^5$ and $R^6$ are respectively hydrogen or an alkyl group of from 1 to 6 carbons; and m is an integer of 1 to 6; and an aluminoxane as a catalyst component (B) represented by the general formula (2) or (3):

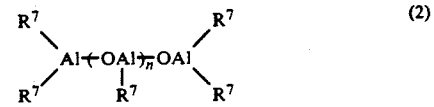

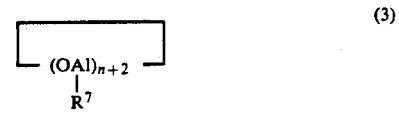

where n is an integer of from 4 to 60; and $R^7$ is an alkyl of from 1 to 6 carbons, phenyl or benzyl, preferably methyl, and a process for producing a polymer of an aromatic vinyl compound, comprising polymerizing the aromatic vinyl compound in the presence of the catalyst.

12 Claims, No Drawings

PROCESS FOR PRODUCING SYNDIOTACTIC POLYMER OF AROMATIC VINYL COMPOUNDS

BACKGROUND OF THE INVENTION

1. Field of the Invention

The present invention relates to a catalyst for polymerizing an aromatic vinyl compound, and a process for producing a polymer of the aromatic vinyl compound. More particularly, the present invention relates to a catalyst and a process for producing an aromatic vinyl compound polymer mainly in the syndiotactic configuration with high catalyst activity.

2. Discussion of the Background

Polymers of aromatic vinyl compounds include polymers of three types of configuration, namely syndiotactic, isotactic and atactic polymers. Among them, polymers of syndiotactic configuration are useful as heat-resistant polymers because of the higher melting point and the larger crystallization rate in comparison with the polymers in other types of configuration.

A syndiotactic aromatic vinyl compound polymer was produced, for example, by employing a catalyst composed of a titanium compound such, as a titanium halide, and alkoxytitanium and a reaction product of an organoaluminum compound with a condensing agent such as a methylaluminoxane as disclosed in Japanese Patent Application Laid-Open No. Sho 62-104818. The catalyst systems of the prior art, however, exhibit unsatisfactorily low catalytic activity, and require substantial improvements in the catalyst activity.

Additionally, methylaluminoxane which is a reaction product of an organic aluminum compound with water, as a condensing agent is extremely expensive, so that the amount to be used of the methylaluminoxane is desired to be low in view of the cost.

The inventors of the present invention have made a comprehensive study to solve the above-mentioned problems, and found that use of a specific catalyst system enables production of an aromatic vinyl compound polymer mainly in the syndiotactic configuration with high catalyst activity.

SUMMARY OF THE INVENTION

The present invention provides a catalyst for producing a polymer of an aromatic vinyl compound mainly in the syndiotactic configuration with high catalyst activity, and a process for producing the polymer.

The catalyst of the present invention comprises a transition metal compound as a catalyst component (A) represented by the general formula (1):

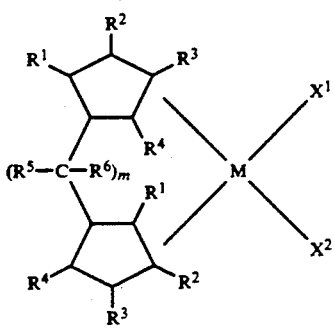

where M is an element of Group IVb of the Periodic Table of the Elements; $X^1$ and $X^2$ are, individually, halogen; $R^1$, $R^2$, $R^3$, $R^4$, $R^5$ and $R^6$ are, individually, hydrogen or an alkyl group of from 1 to 6 carbons; and m is an integer of 1 to 6; and an aluminoxane as a catalyst component (B) represented by the general formula (2) or (3):

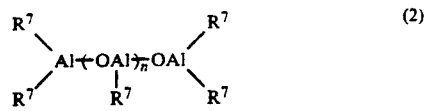

where n is an integer of from 4 to 60; and $R^7$ is an alkyl group.

The present invention also provide a process for producing a polymer of an aromatic vinyl compound in the syndiotactic configuration with high catalyst activity by employing the above specified catalyst.

DETAILED DESCRIPTION OF THE PREFERRED EMBODIMENTS

The component (A) of the catalyst for polymerizing an aromatic vinyl compound of the present invention is a transition metal compound represented by the general formula below:

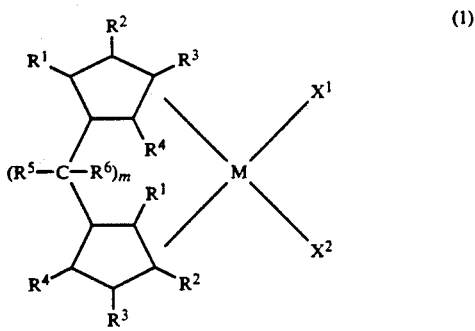

where M is an element of Group IVb; $X^1$ and $X^2$ are, individually, halogen; $R^1$, $R^2$, $R^3$, $R^4$, $R^5$ and $R^6$ are, individually, hydrogen or an alkyl group of from 1 to 6 carbons; and m is an integer of 1 to 6.

The transition metal (M) is an element of Group IVb of the Periodic Table of Elements, including titanium, zirconium, and hafnium, of which titanium is preferred.

$X^1$ and $X^2$ are, individually, a halogen (F, Cl, Br, I), preferably chlorine.

The substituents, $R^1$ to $R^6$, are, individually hydrogen or an alkyl group of 1 to 6 carbons. The alkyl group includes both linear and branched alkyl groups such as methyl, ethyl, propyl, n-butyl, isobutyl, tert-butyl, n-pentyl, isopentyl, n-hexyl, isohexyl, and the like.

The size (m) of the bridge between the two cyclopentadienyl rings is from 1 to 6, preferably from 1 to 2.

The catalyst component (A) specifically includes methylene-bis(cyclopentadienyl)titanium dichloride, ethylene-bis(2,3,4,5-tetramethylcyclopentadienyl)-titanium dichloride, and the like.

The catalyst component (B) is an aluminoxane represented by the general formula (2) or (3):

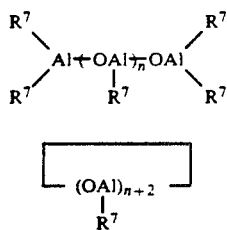

(2)

(3)

$R^7$ is an alkyl group of from 1 to 6 carbons, phenyl or benzyl, preferably methyl. The variable "n" is an integer of from 4 to 60, preferably not less than 6.

These compounds may be commercial products, or may be prepared according to a known method. The preparation of the compounds is conducted, for example, by adding an aluminum compound into a suspension of a crystalline-water-containing salt (such as copper sulfate hydrate, aluminum sulfate hydrate, etc.) in a hydrocarbon medium.

The molar ratio of the catalyst component (B) to the catalyst component (A) to be used, (B)/(A), is preferably within the range of from 10 to 1000. With the catalyst system of the present invention, polymers of sufficiently high stereo-regularity can be obtained at the molar ratio, Al/Ti, of less than 300, or further, as low as less than 100.

The aromatic vinyl compounds to be polymerized in the present invention include styrene or derivatives thereof. The derivatives of styrene include alkylstyrenes such as methylstyrene, ethylstyrene, dimethylstyrene, etc.; halogenated styrenes such as chlorostyrene, bromostyrene, fluorostyrene, etc.; halogen-substituted alkylstyrenes such as chloromethylstyrene; alkoxystyrenes such as methoxystyrene; carboxymethylstyrene, alkyl ether styrenes, alkylsilylstyrenes, and the like.

The polymerization of the aromatic vinyl compound in the presence of the aforementioned catalyst in the present invention may be conducted in bulk, or in a medium of an aliphatic hydrocarbon such as pentane, hexane, heptane, etc.; an alicyclic hydrocarbon such as cyclohexane; or an aromatic hydrocarbon such as benzene, toluene, xylene, etc.

The catalyst component (A) is used at a concentration in the range of from 0.1 to 1000 mmol/l in the solution.

The polymerization temperature is not specially limited, but is preferably in the range of from $-70°$ C. to 150° C.

As described above, the use of the catalyst of the present invention gives an aromatic vinyl compound polymer having syndiotactic configuration with high catalyst activity.

Further, the catalyst system of the present invention exhibits not only improved activity of the main catalyst but also sufficient effect using lower amounts of aluminoxane as the cocatalyst in comparison with the catalyst systems of the prior art, and is economically advantageous.

The present invention is described in more detail below without limiting the invention in any way.

EXAMPLES

Example 1

In a Schlenk type reaction vessel having been purged with nitrogen, 26.2 mg (0.10 mmol) of methylene-bis(-cyclopentadienyl)titanium dichloride was weighted out, and 10 ml of toluene was added. Further thereto, 15.0 g (144 mmol) of styrene, and 4 mmol of methylaluminoxane (made by Tosoh-Akzo Co.) were added, and polymerization was conducted at 15° C. for 5 hours.

At the end of the reaction, 0.5 ml of methanol was added to decompose the catalyst. The reaction product was put into a mixture of 200 ml of methanol with 2 ml of hydrochloric acid, and was stirred sufficiently. The resulting white polymer was collected by filtration, and washed with 50 ml of methanol twice. The yield of the dried polymer was 13.7 g.

Subsequently the polymer was extracted with methyl ethyl ketone by Soxhlet extraction for 12 hours, giving 12.1 g of a residual polymer.

The resulting polymer had a weight-average molecular weight of 52000 and a number-average molecular weight of 14000 according to gel permeation chromatography (GPC), and had a melting point of 267° C. according to differential scanning calcrimetry (DSC) measurement. Configuration analysis of the polymer by $^{13}$C-NMR in o-dichlorobenzene showed that the polymer had the pentad rrrr at a level of not less than 99% as calculated from the peak of 145.5 ppm originating from the syndiotactic configuration.

Example 2

In a Schlenk type reaction vessel having been purged with nitrogen, 26.2 mg (0.10 mmol) of methylene-bis(-cyclopentadienyl)titanium dichloride was weighed out, and 20 ml of toluene was added. Further thereto, 13.6 g (131 mmol) of styrene, and 20 mmol of methylaluminoxane (made by Tosoh-Akzo Co.) were added, and polymerization was conducted at 15° C. for 5 hours.

At the end of the reaction, 0.5 ml of methanol was added to decompose the catalyst. The reaction product was put into a mixture of 200 ml of methanol with 2 ml of hydrochloric acid, and was stirred sufficiently. The resulting white polymer was collected by filtration, and washed with 50 ml of methanol twice. The yield of the dried polymer was 12.0 g.

Subsequently the polymer was extracted with methyl ethyl ketone by Soxhlet extraction for 12 hours, giving 11.1 g of a residual polymer.

Configuration analysis of the polymer by $^{13}$C-NMR in o-dichlorobenzene showed that the polymer had the pentad rrrr at a level of not less than 99% as calculated from the peak of 145.5 ppm originating from the syndiotactic configuration.

Example 3

In a Schlenk type reaction vessel having been purged with nitrogen, 38.7 mg (0.10 mmol) of ethylene-bis(2,3,4,5-tetramethylcyclopentadienyl)titanium dichloride was weighed out, and 10 ml of toluene was added. Further thereto, 13.6 g (131 mmol) of styrene, and 4 mmol of methylaluminoxane (made by Tosoh-Akzo Co.) were added, and polymerization was conducted at 15° C. for 5 hours.

At the end of the reaction, 0.5 ml of methanol was added to decompose the catalyst. The reaction product was put into a mixture of 200 ml of methanol with 2 ml of hydrochloric acid, and was stirred sufficiently. The resulting white polymer was collected by filtration, and washed with 50 ml of methanol twice.

Subsequently the polymer was extracted with methyl ethyl ketone by Soxhlet extraction for 12 hours, giving 0.113 g of a residual polymer.

Configuration analysis of the polymer by $^{13}$C-NMR in o-dichlorobenzene showed that the polymer had the pentad rrrr at a level of 96% as calculated from the peak of 145.5 ppm originating from the syndiotactic configuration.

Comparative Example 1

Polymerization of styrene was conducted in the same manner as in Example 1 except that 0.10 mmol of titanocene dichloride was used in place of the methylene-bis(-cyclopentadienyl)titanium dichloride.

As the result, the yield of the dried polymer was 0.062 g.

Comparative Example 2

Polymerization of styrene was conducted in the same manner as in Example 1 except that 0.10 mmol of pentamethylcyclopentadienyltitanium dichloride was used in place of the methylene-bis(cyclopentadienyl)titanium dichloride.

As the result, the yield of the dried polymer was 0.063 g.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a syndiotactic polymer of an aromatic vinyl compound, comprising polymerizing an aromatic vinyl compound in the presence of a catalyst comprising a transition metal compound as a catalyst component (A) having the formula (1):

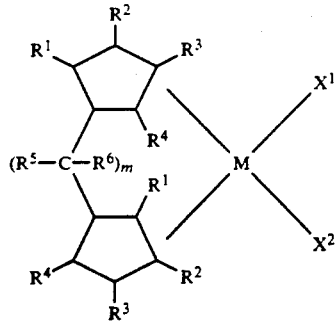

wherein M is an element of Group IVb of the Periodic Table of Elements; $X^1$ and $X^2$ are, individually, halogen; $R^1$, $R^2$, $R^3$, $R^4$, $R^5$ and $R^6$ are, individually, hydrogen or an alkyl group of from 1 to 6 carbons; and m is an integer of 1 to 6; and an aluminoxane as a catalyst component (B) having the formula (2) or (3):

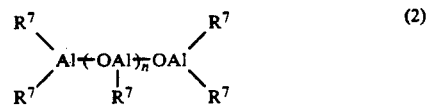

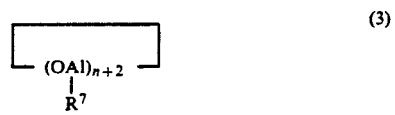

wherein n is an integer of from 4 to 60; and $R^7$ is an alkyl group of from 1 to 6 carbons, phenyl or benzyl.

2. The process of claim 1, wherein M is titanium, zirconium or hafnium.

3. The process of claim 1, wherein M is titanium.

4. The process of claim 1, wherein m is 1-2.

5. The process of claim 1, wherein said halogen is chlorine.

6. The process of claim 1, wherein said catalyst is methylene-bis(cyclopentadienyl)titanium dichloride.

7. The process of claim 1, wherein said catalyst is ethylene-bis(2,3,4,5-tetramethylcyclopentadienyl)-titanium dichloride.

8. The process of claim 1, wherein the molar ratio of component (B) to component (A) is in the range from 10 to 1,000.

9. The process of claim 1, wherein the molar ratio of Al/Ti is less than 300.

10. The process of claim 1, wherein said polymerizing step is conducted at a temperature in the range of from −70° C. to 150° C.

11. The process of claim 1, wherein said polymerizing step is conducted in the presence of a solvent selected from the group consisting of aliphatic hydrocarbons, alicyclic hydrocarbons and aromatic hydrocarbons.

12. The process of claim 1, wherein said polymerizing step is conducted a concentration of component (A) of from 0.1 to 1,000 mmol/l.

* * * * *